United States Patent
Hishioka et al.

(10) Patent No.: US 7,748,515 B2
(45) Date of Patent: Jul. 6, 2010

(54) STORAGE CONVEYOR

(75) Inventors: Shinji Hishioka, Toyota (JP); Yasuhide Nakamura, Toyota (JP); Masashi Nakamura, Toyota (JP); Toshimitsu Sakai, Osaka (JP); Syunji Sakura, Osaka (JP); Hiroki Ishida, Osaka (JP)

(73) Assignees: Toyota Jidosha Kabushiki Kaisha, Toyota-shi (JP); Tsubakimoto Chain Co., Osaka-shi (JP)

( * ) Notice: Subject to any disclaimer, the term of this patent is extended or adjusted under 35 U.S.C. 154(b) by 0 days.

(21) Appl. No.: 12/295,221

(22) PCT Filed: Mar. 27, 2007

(86) PCT No.: PCT/JP2007/057353
§ 371 (c)(1),
(2), (4) Date: Nov. 3, 2008

(87) PCT Pub. No.: WO2007/114412
PCT Pub. Date: Oct. 11, 2007

(65) Prior Publication Data
US 2009/0166155 A1    Jul. 2, 2009

(30) Foreign Application Priority Data
Mar. 30, 2006  (JP) ............................. 2006-093951

(51) Int. Cl.
*B65G 1/00* (2006.01)
(52) U.S. Cl. ................................. 198/347.1; 198/347.2
(58) Field of Classification Search .............. 198/347.1, 198/347.2
See application file for complete search history.

(56) References Cited

U.S. PATENT DOCUMENTS

| | | | | |
|---|---|---|---|---|
| 4,964,498 | A * | 10/1990 | Klingl ...................... | 198/347.1 |
| 5,253,743 | A * | 10/1993 | Haas et al. ................ | 198/347.1 |
| 5,735,380 | A * | 4/1998 | Schneider et al. ......... | 198/347.1 |
| 7,025,191 | B2 * | 4/2006 | Lichti et al. .............. | 198/347.1 |
| 2001/0025765 | A1 * | 10/2001 | Ikegami ................... | 198/347.1 |

FOREIGN PATENT DOCUMENTS

| | | |
|---|---|---|
| JP | 61-263518 | 11/1986 |
| JP | 03-106721 | 5/1991 |
| JP | 03-192092 | 8/1991 |
| JP | 2006-044881 | 2/2006 |

* cited by examiner

*Primary Examiner*—James R Bidwell
(74) *Attorney, Agent, or Firm*—Kenyon & Kenyon LLP

(57) ABSTRACT

A storage conveyor that secures a number of stored workpieces while saving space is provided. When a sprocket on a driving side is driven to rotate in a forward/reverse direction by a chain drive motor, opposing bend suppression members between a pair of chains are successively engaged/disengaged, and an opposing portion between the pair of chains is extended/retracted with respect to a workpiece conveyance surface. Thus, workpieces are passed between the workpiece conveyance surface and workpiece receivers. Consequently, the workpieces can be stored in a vertical direction (up-down direction), making it possible to secure the number of stored workpieces while saving space.

2 Claims, 5 Drawing Sheets

STORAGE CONVEYOR

This is a 371 national phase application of PCT/JP2007/057353 filed 27 Mar. 2007, claiming priority to Japanese Patent Application No. JP 2006-093951 filed 30 Mar. 2006, the contents of which are incorporated herein by reference.

FIELD OF THE INVENTION

The present invention relates to a storage conveyor, and in particular, relates to a module-type storage conveyor that is incorporated in an assembly line.

BACKGROUND OF THE INVENTION

In parts assembly lines, for example, there are cases in which workpieces (workpieces in process) are stored between two adjacent processes of a workpiece conveyance path. In such cases, storage conveyors are generally used. Conventionally, in such assembly lines, workpieces are arranged in a line on a storage conveyer in a workpiece conveyance direction, and therefore, the storage conveyor is elongated depending on the number of stored workpieces. When a large number of workpieces are stored, the size of the assembly line is expanded, and thus, the occupied area increases. Under such circumstances, a storage conveyor has conventionally been used that utilizes a space above the workpiece conveyance path, with workpieces stored in a vertical direction (refer to Patent Document 1, for example). However, in the conventional storage conveyor, since a pair of endless belts (or endless chains) are arranged on both sides in a width direction of the conveyance path, the arrangement of (the gap between) the pair of endless belts must be changed depending on the workpieces. Thus, it is difficult to quickly respond to a change in workpieces. In addition, since the pair of endless belts always occupy the spaces on both sides of and above the workpiece conveyance path, the size of the storage conveyor becomes large and interferes with maintenance operation.

Patent Document 1: Japanese Patent Application Publication No. H03-106721

SUMMARY OF THE INVENTION

Problem to be Solved by the Invention

The present invention has been devised in light of the above circumstances, and it is an object thereof to provide a storage conveyor that secures a number of stored workpieces while saving space.

Means for Solving the Problem

In order to achieve the object described above, the storage conveyor according to a first aspect of the present invention is characterized by including: a pair of chains arranged opposite to each other; a bend suppression member provided at each facing surface of the chains, wherein the bend suppression members are engaged with each other at an opposing portion of the pair of chains so as to suppress bending of the opposing portion; a pair of sprockets holding the opposing portion of the pair of chains so as to perform extension/retraction of the opposing portion of the pair of chains; wherein the pair of chains are arranged on one side of the main body frame while each end portion of the pair of chains is fixed to the main body frame; some number of workpiece receivers are provided at the opposing portion of the pair of chains at a predetermined interval in a direction in which the opposing portion extends; a hollow portion is formed between the opposing bend suppression members at the opposing portion of the pair of chains and is extended in an extended direction of the opposing portion along the opposing portion of the pair of chains; a telescopic shaft is housed in the hollow portion where one end of the telescopic shaft is fixed to the main body frame while the other end thereof is fixed to the opposing portion of the pair of chains, and the opposing portion of the pair of chains is supported with the telescopic shaft.

The storage conveyor according to a second aspect of the present invention is characterized in that among a pair of sprockets that are incorporated in a workpiece conveyance path provided in an assembly line and that sandwich the opposing portion of the pair of chains, at least one sprocket is driven to rotate, whereby the opposing portion of the pair of chains is extended/retracted with respect to a workpiece conveyance surface and workpieces are passed between the workpiece conveyance surface and the workpiece receivers while the telescopic shaft is extended/retracted in conjunction with the extension/retraction operation of the opposing portion.

In the storage conveyor according to the first aspect, the opposing bend suppression members between the opposing pair of chains are engaged with each other to suppress bending of the opposing portion. As a result, the opposing portion of the pair of chains can stand upright.

In addition, in the storage conveyor according to the second aspect, the sprocket is driven to rotate so that the opposing portion of the pair of chains is extended/retracted with respect to the workpiece conveyance surface. Accordingly, the workpieces are passed between the workpiece conveyance surface and the workpiece receivers provided at the opposing portion of the pair of chains. At this time, the opposing portion of the pair of chains is supported by the telescopic shaft that extends/retracts in conjunction with the extension/retraction operation of the opposing portion.

EFFECT OF THE INVENTION

The present invention can provide a storage conveyor that secures a number of stored workpieces while saving space.

Figure 1:
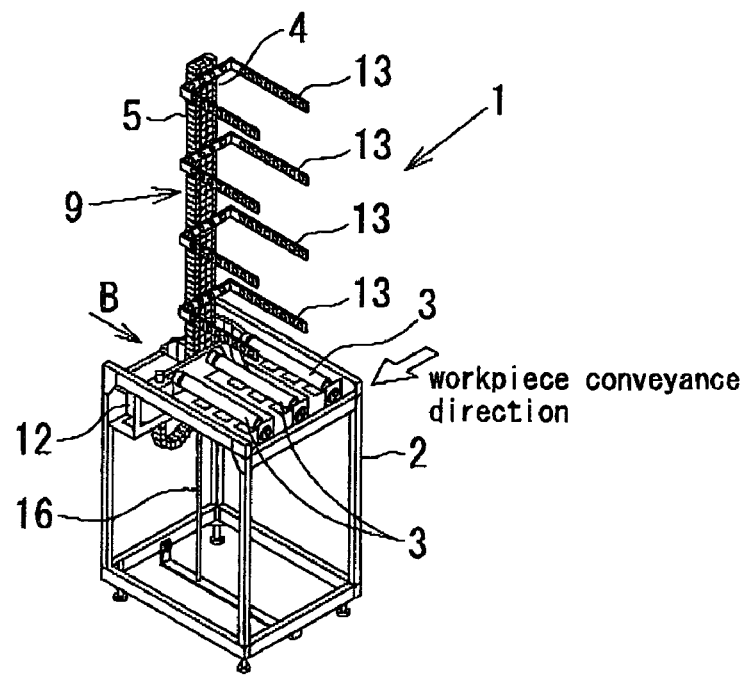
FIG. 1 is a perspective view showing a storage conveyor according to the present invention and especially showing a state in which an opposing portion of a pair of chains is extended.

DESCRIPTION OF THE REFERENCE NUMERALS 1 storage conveyor
2 main body frame
4, 5 chain
8 bend suppression member
9 opposing portion
10, 11 sprocket
12 chain drive motor
13 workpiece receiver
14 workpiece
15 hollow portion
16 telescopic shaft

DETAILED DESCRIPTION

Figure 2:
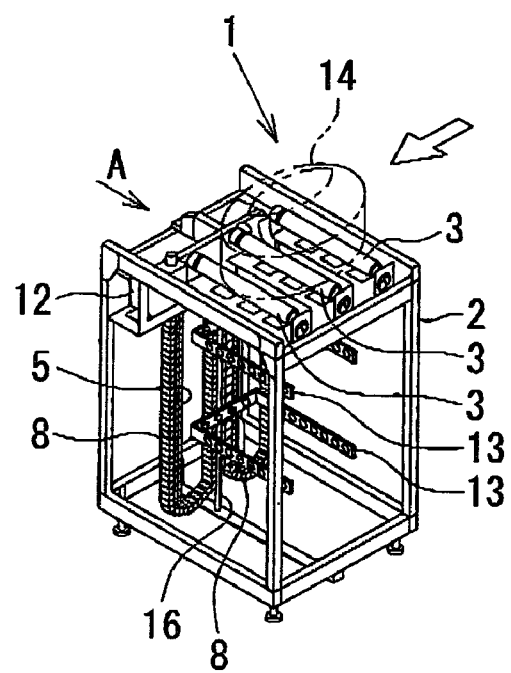
FIG. 2 is a perspective view showing the storage conveyor and especially showing a state in which the opposing portion of the pair of chains is retracted.
Figure 3:
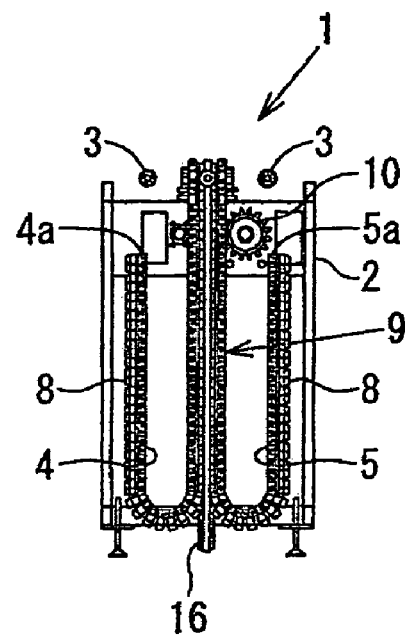
FIG. 3 is a view taken along an arrow A in FIG. 2.
Figure 4:
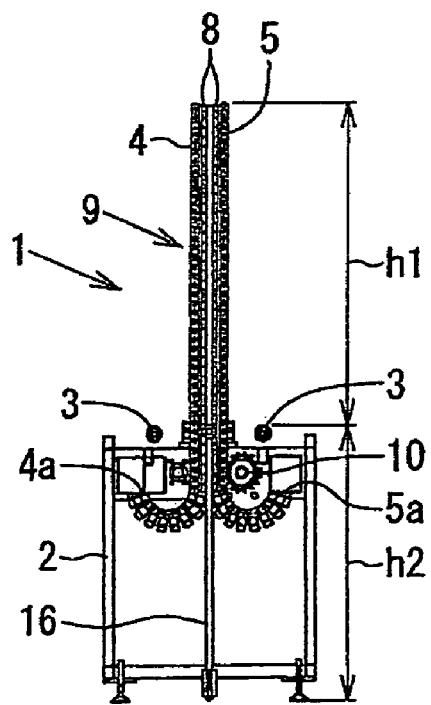
FIG. 4 is a view taken along an arrow B in FIG. 1.
Figure 5:
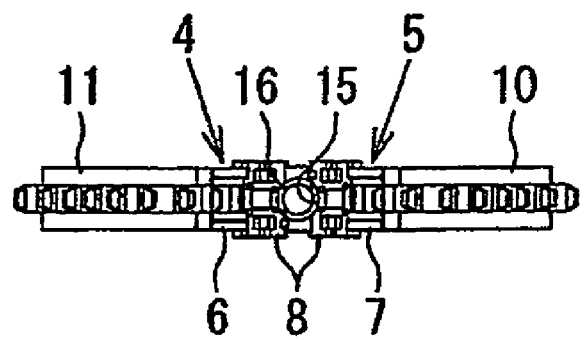
FIG. 5 is a plan view showing a state in which the opposing portion of the pair of chains is held between a pair of sprockets.
Figure 6:
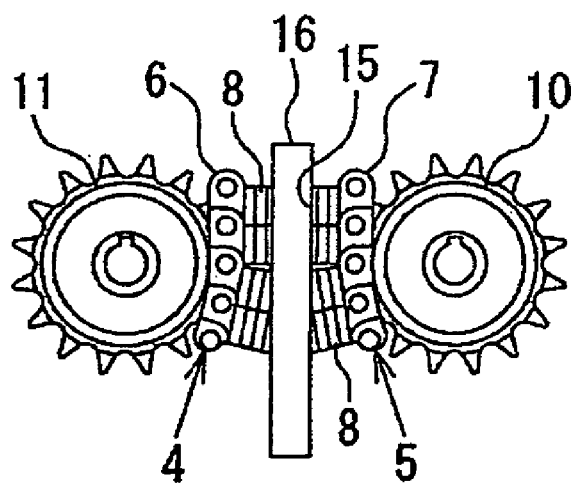
FIG. 6 is a front view showing a state in which the opposing portion of the pair of chains is held between the pair of sprockets.
Figure 7:
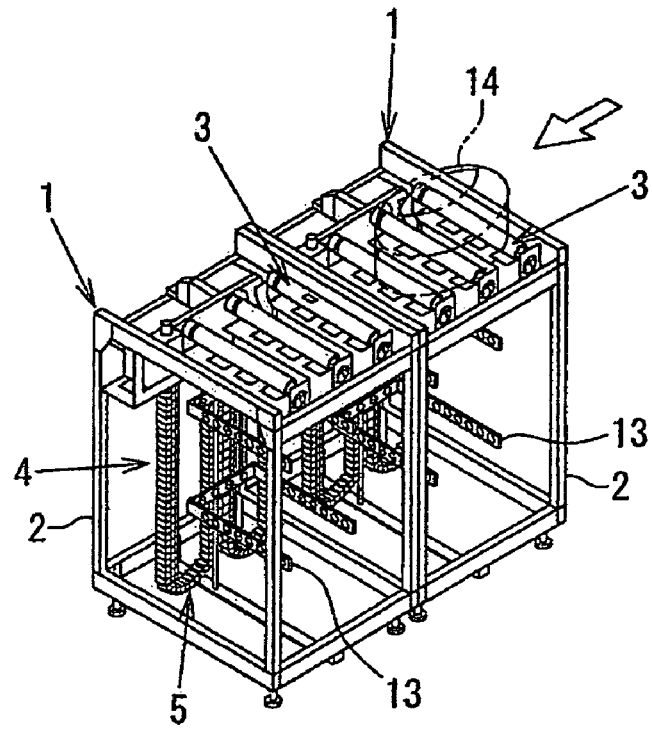
FIG. 7 is an explanatory view for illustrating an operation of the storage conveyor, and shows a state in which an initial workpiece is carried in an upstream side storage conveyor.

An embodiment of the present invention will be described based on FIGS. 1 to 10. A storage conveyor 1 of the present invention is installed between two adjacent processes in a parts assembly line, and a conveyed workpiece 14 (a workpiece in process) is stored in or carried out of the storage conveyor 1 as appropriate. As shown in FIGS. 2 and 3, the storage conveyor 1 is provided with a plurality of conveyor rollers 3 (three in this embodiment) above a main body frame 2, each of which is driven to rotate by a roller drive motor. The storage conveyor 1 is also provided with a pair of chains 4 and 5 on a side of the main body frame 2 (in the present embodiment, on the right side in the workpiece conveyance direction). The chains 4 and 5 have each hang in a U shape due to the weight thereof and are arranged opposite to each other, with fixed ends 4a and 5a on both sides thereof fixed to the main body frame 2. Moreover, as shown in FIGS. 5 and 6, the storage conveyor 1 is provided with bend suppression members 8 on each of opposing surfaces (outward surfaces of the U shape) of links 6 and 7 of the respective chains 4 and 5. The opposing bend suppression members 8 at an opposing portion 9 of the pair of chains 4 and 5 (a portion wherein the pair of chains 4 and 5 are arranged opposite to each other) are engaged (meshed) with each other. As a result, bending of the opposing portion 9 is suppressed.

Furthermore, in the storage conveyor 1, the opposing portion 9 of the pair of chains 4 and 5 is held between a pair of sprockets 10 and 11 that are provided in the main body frame 2. In the storage conveyor 1, when the sprocket 10 on a driving side is driven to rotate in a forward direction (driven in a clockwise direction in FIG. 6) by a chain drive motor 12, the opposing bend suppression members 8 between the pair of chains 4 and 5 are successively engaged. As a result, as shown in FIGS. 1 and 4, the opposing portion 9 of the pair of chains 4 and 5 is extended in an upright state above a workpiece conveyance surface (conveyor pass line). Also, in the storage conveyor 1, when the sprocket 10 on the driving side is driven to rotate in a reverse direction (driven in a counterclockwise direction in FIG. 6) by the chain drive motor 12, the opposing bend suppression members 8 at the opposing portion 9 of the pair of chains 4 and 5 are successively disengaged. As a result, as shown in FIGS. 2 and 3, the opposing portion 9 of the pair of chains 4 and 5 is retracted below the workpiece conveyance surface (conveyor pass line). Note that, in the storage conveyor 1, as shown in FIG. 4, a maximum lifting height $h1$ of the opposing portion 9 of the pair of chains 4 and 5 is set higher than a conveyor height $h2$ (a height of the conveyor pass line), that is, $h1 > h2$.

Also, as shown in FIGS. 1 and 2, the storage conveyor 1 is provided with generally C-shaped workpiece receivers 13 at the opposing portion 9 of the pair of chains 4 and 5. Due to extension/retraction of the opposing portion 9 of the pair of chains 4 and 5, the workpiece 14 is passed between the workpiece receiver 13 and the conveyor rollers 3. Note that, as shown in FIG. 1, in the storage conveyor 1, four workpiece receivers 13 are attached to the opposing portion 9 of the pair of chains 4 and 5 at a predetermined interval in a direction in which the opposing portion 9 extends (an up-down direction in FIG. 1). Moreover, in the storage conveyor 1, a hollow portion 15 that extends in the up-down direction along the opposing portion 9 is formed between the opposing bend suppression members 8 at the opposing portion 9 of the pair of chains 4 and 5. Accommodated in the hollow portion 15 is a telescopic shaft 16 having a lower end portion fixed to the main body frame 2 and an upper end portion fixed to a predetermined position of the opposing portion 9. In the storage conveyor 1, the opposing portion 9 of the pair of chains 4 and 5 is supported by the telescopic shaft 16 that extends and retracts in conjunction with the extension/retraction operation of the opposing portion 9.

Figure 8:
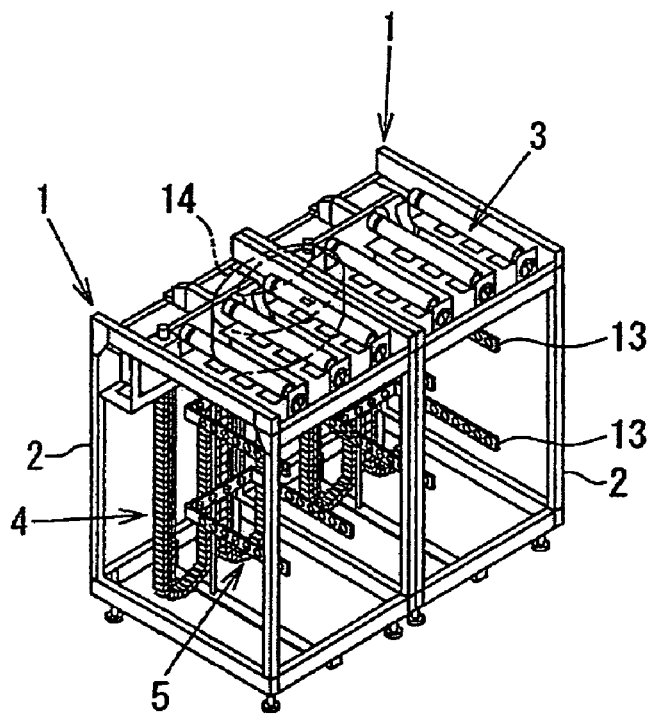
FIG. 8 is an explanatory view for illustrating an operation of the storage conveyor, and shows a state in which the initial workpiece is set at a loading position of a downstream side storage conveyor.
Figure 9:
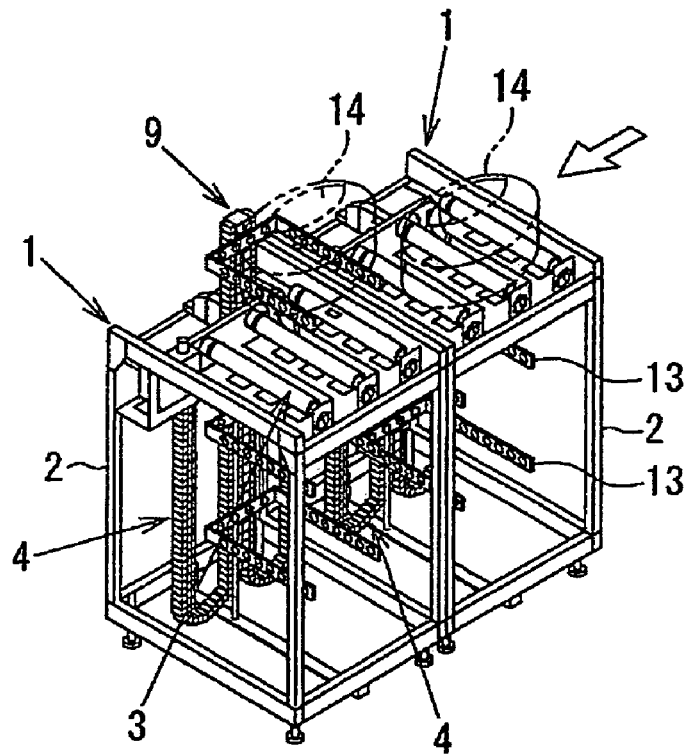
FIG. 9 is an explanatory view for illustrating an operation of the storage conveyor, and shows a state in which the initial workpiece is lifted by an uppermost workpiece receiver of the downstream side storage conveyor and a following workpiece is carried in the upstream side storage conveyor.

Next, operations of the storage conveyor 1 will be explained. An example in which the workpiece 14 is carried to two storage conveyors 1 connected in series will be explained here. First, as shown is FIG. 7, the workpiece 14 carried by a conveyor from a preceding process is carried to the storage conveyor 1 on the upstream side, and then, as shown in FIG. 8, is conveyed by the conveyor rollers 3 from the upstream side storage conveyor 1 to the downstream side storage conveyor 1. When the workpiece 14 is detected by a workpiece detection sensor, conveyance of the workpiece 14 is stopped and the workpiece 14 is set at a loading position. Then, the sprocket 10 on the driving side is driven to rotate in the forward direction, and the opposing bend suppression members 8 between the pair of chains 4 and 5 are successively engaged. As a result, the opposing portion 9 of the pair of chains 4 and 5 is extended in an upright state above the workpiece conveyance surface (conveyor pass line). Consequently, as shown in FIG. 9, among the workpiece receivers 13 attached to the opposing portion 9 of the pair of chains 4 and 5, the uppermost workpiece receiver 13 lifts the workpiece 14 on the workpiece conveyance surface of the downstream side storage conveyor 1.

At this time, the telescopic shaft 16 is extended in conjunction with the extension operation of the opposing portion 9 of the pair of chains 4 and 5. When the workpiece 14 is lifted to a predetermined height with respect to the workpiece conveyance surface, extension of the opposing portion 9 of the pair of chains 4 and 5 is stopped and lifting of the workpiece 14 is also stopped. Note that, when extension of the opposing portion 9 of the pair of chains 4 and 5 is stopped, the second workpiece receiver 13 from the top is set below the workpiece conveyance surface. Also, in parallel with lifting the initial workpiece 14, the following workpiece 14 is carried to the upstream side storage conveyor 1 and set at a waiting position of the upstream side storage conveyor 1, as shown in FIG. 9. Then, after lifting of the initial workpiece 14 is completed, the conveyor rollers 3 of the two storage conveyors 1 are driven to rotate and the following workpiece 14 is conveyed from the upstream side storage conveyor 1 to the downstream side storage conveyor 1.

Figure 10:
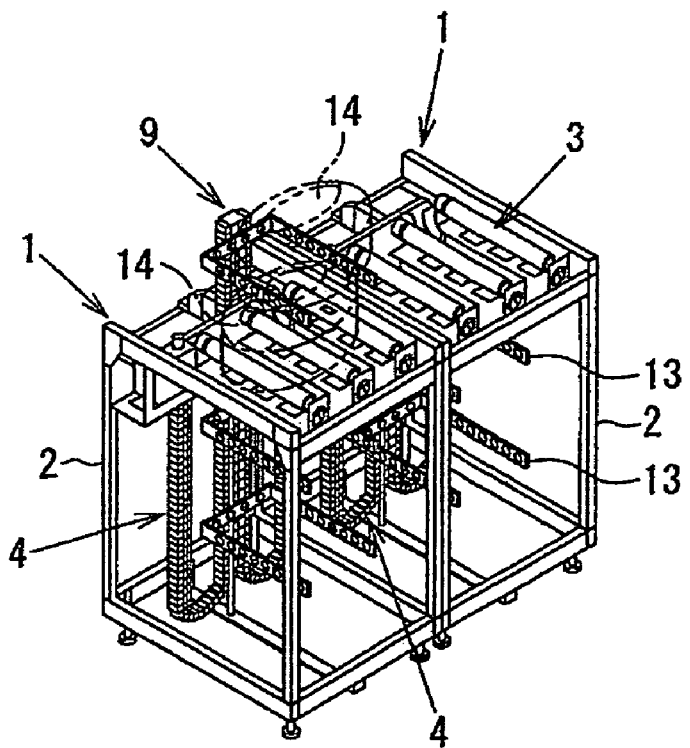
FIG. 10 is an explanatory view for illustrating an operation of the storage conveyor, and shows a state in which the following workpiece is set at the loading position of the downstream side storage conveyor.

When the workpiece detection sensor provided in the downstream side storage conveyor 1 detects that the following workpiece 14 has reached the loading position, conveyance of the following workpiece 14 is stopped and the workpiece 14 is set at the loading position, as shown in FIG. 10. Then, when the following workpiece 14 is set at the loading position, the sprocket 10 on the driving side is driven to rotate in the forward direction, and the opposing bend suppression members 8 between the pair of chains 4 and 5 are successively engaged. As a result, the opposing portion 9 of the pair of chains 4 and 5 is extended in an upright state above the workpiece conveyance surface (conveyor pass line). Consequently, among the workpiece receivers 13 attached to the opposing portion 9 of the pair of chains 4 and 5, the second workpiece receiver 13 from the top lifts the following workpiece 14 set at the loading position of the workpiece conveyance surface of the downstream side storage conveyor 1. At this time, the telescopic shaft 16 is extended in conjunction with the extension operation of the opposing portion 9 of the pair of chains 4 and 5.

When the following workpiece 14 is lifted to the predetermined height with respect to the workpiece conveyance surface, extension of the pair of chains 4 and 5 is stopped, and thus, lifting of the workpiece 14 is stopped. By repeating the above operations, the workpieces 14 are stored on the workpiece receivers 13 attached to the opposing portion 9 of the pair of chains 4 and 5 of the downstream side storage conveyor 1 one by one, starting from the uppermost workpiece receiver 13. When the downstream side storage conveyor 1 is fully loaded, the workpieces 14 are stored on the workpiece receivers 13 attached to the opposing portion 9 of the pair of chains 4 and 5 of the upstream side storage conveyor 1 one by one, starting from the uppermost workpiece receiver 13, in the same manner as in the downstream side storage conveyor 1.

Note that, when the workpieces 14 stored in the two storage conveyors 1 are carried out to a following process, the sprocket 10 on the driving side of the downstream side storage conveyor 1 is driven to rotate in the reverse direction first. Consequently, the opposing portion 9 of the pair of chains 4 and 5 is moved downward, and the telescopic shaft 16 is retracted while the opposing bend suppression members 8 of the opposing portion 9 of the pair of chains 4 and 5 are successively disengaged. Thus, the workpiece receivers 13 descend by a predetermined distance. When the workpiece 14 on the lowermost workpiece receiver 13 among the workpiece receivers 13 attached to the opposing portion 9 of the pair of chains 4 and 5 is set on the workpiece conveyance surface of the downstream side storage conveyor 1, moving of the opposing portion 9 (descent of the workpiece receivers 13) is stopped. Then, when the workpiece 14 is placed on the workpiece conveyance surface, the conveyor rollers 3 of the downstream side storage conveyor 1 are driven to rotate and the workpiece 14 is carried out to the following process.

In this way, the workpieces 14 on the workpiece receivers 13 attached to the opposing portion 9 of the pair of chains 4 and 5 of the downstream side storage conveyor 1 are carried out one by one, starting from the workpiece 14 on the lowermost workpiece receiver 13. When the downstream side storage conveyor 1 becomes empty, the workpieces 14 on the workpiece receivers 13 attached to the opposing portion 9 of the pair of chains 4 and 5 of the upstream side storage conveyor 1 are carried out one by one, starting from the workpiece 14 on the lowermost workpiece receiver 13, in the same manner as in the downstream side storage conveyor 1.

The present embodiment has effects as described below.

The storage conveyor 1 is configured so as to be provided with the pair of chains 4 and 5 on a side of the main body frame 2. The chains each hang in a U shape due to the weight thereof and are arranged opposite to each other, with the fixed ends 4a and 5a on both sides thereof fixed to the main body frame 2. The bend suppression members 8 that are to be engaged with each other at the opposing portion 9 of the pair of chains 4 and 5 are provided on the opposing surfaces of the respective chains 4 and 5. The pair of sprockets 10 and 11 that sandwich the opposing portion 9 of the pair of chains 4 and 5 are provided on a side of the main body frame 2. The workpiece receivers 13 capable of passing the workpieces 14 to and from the workpiece conveyance surface are provided at the opposing portion 9 of the pair of chains 4 and 5. The telescopic shaft 16 having a lower end and another end that are fixed to the main body frame 2 and the opposing portion 9 of the pair of chains 4 and 5, respectively, is accommodated in the hollow portion 15 between the bend suppression members 8 that are engaged with each other at the opposing portion 9 of the pair of chains 4 and 5.

Accordingly, in the storage conveyor 1, when the sprocket 10 on the driving side is driven to rotate in the forward/reverse direction by the chain drive motor 12, the opposing bend suppression members 8 between the pair of chains 4 and 5 are successively engaged/disengaged and the opposing portion 9 of the pair of chains 4 and 5 is extended/retracted with respect to the workpiece conveyance surface. Thus, the workpieces 14 are passed between the workpiece conveyance surface and the workpiece receivers 13. As a result, the workpieces 14 can be stored in the vertical direction (up-down direction). Thus, compared to the conventional storage conveyor that yields the number of stored workpieces based on the length of the conveyor, the size (occupied area) of an assembly line in the workpiece conveyance direction can be significantly reduced.

Moreover, in a state in which the workpieces 14 are not stored, the opposing portion 9 of the pair of chains 4 and 5 is accommodated in the main body frame 2 of the storage conveyor 1. Therefore, the storage conveyor 1 can be made smaller, compared to the conventional storage conveyor in which the workpieces 14 are stored in the vertical direction on endless belts provided at both sides of the workpiece conveyance surface. This facilitates maintenance and enables a quick response to a change in the workpieces 14.

Furthermore, in the storage conveyor 1, the opposing portion 9 of the pair of chains 4 and 5 is supported by the telescopic shaft 16 that is extended/retracted in conjunction with the extension/retraction operation of the opposing portion 9. Thus, the strength of the opposing portion 9 is secured.

In addition, in the storage conveyor 1, the maximum lifting height h1 of the opposing portion 9 of the pair of chains 4 and 5 can be set higher than the conveyor height h2 (the height of the conveyor pass line). Therefore, more workpieces 14 can be stored, compared to the case in which the storage conveyor is configured such that a support column which extends in the vertical direction and can be accommodated in the main body frame 2 is moved in the up-down direction instead of the opposing portion 9 of the pair of chains 4 and 5. In this case, the workpiece receivers 13, especially the workpiece receivers 13 located at a lower part, must have a configuration in which each workpiece receiver 13 is divided into two parts and the two parts are attached to the chains 4 and 5, respectively.

Note that embodiments are not limited to the above, and may also be configured as described below, for example.

In this embodiment, two storage conveyors 1 are connected in series. However, a plurality of storage conveyors 1 may be connected in series or may be arranged in parallel as appropriate.

The invention claimed is:

1. A storage conveyor, comprising:
   a pair of chains arranged opposite to each other;
   a bend suppression member provided at each facing surface of the chains wherein the bend suppression members are engaged with each other at an opposing portion of the pair of chains so as to suppress bending of the opposing portion;
   a pair of sprockets holding the opposing portion of the pair of chains so as to perform extension/retraction of the opposing portion of the pair of chains;
   wherein the pair of chains are arranged on one side of a main body frame while each end portion of the pair of chains is fixed to the main body frame;
   some number of workpiece receivers are provided at the opposing portion of the pair of chains at a predetermined interval in a direction in which the opposing portion extends;
   a hollow portion is formed between the opposing bend suppression members at the opposing portion of the pair of chains and is extended in an extended direction of the opposing portion along the opposing portion of the pair of chains;
   a telescopic shaft is housed in the hollow portion where one end of the telescopic shaft is fixed to the main body frame while the other end thereof is fixed to the opposing portion of the pair of chains, and the opposing portion of the pair of chains is supported with the telescopic shaft.

2. The storage conveyor according to claim 1, wherein the storage conveyor is installed in a workpiece conveyance path provided in an assembly line, and at least one sprocket among a pair of sprockets which hold the opposing portion of the pair of chains-is driven to rotate, whereby the opposing portion of the pair of chains is extended/retracted with respect to a workpiece conveyance surface and workpieces are passed between the workpiece conveyance surface and the workpiece receivers while the telescopic shaft is extended/retracted in conjunction with the extension/retraction operation of the opposing portion.

* * * * *